United States Patent Office 2,796,424
Patented June 18, 1957

2,796,424

SEPARATION PROCESS BY ADSORPTION

Wallace W. Schulz, Robert A. Watts, Jr., and Robert Lee Moore, Richland, Wash., assignors to the United States of America as represented by the United States Atomic Energy Commission No Drawing. Application March 4, 1954,
Serial No. 414,234

6 Claims. (Cl. 260—429)

This invention deals with the separation and recovery of ruthenium values and at least one of zirconium and niobium values from aqueous solutions, for instance from ore-processing solutions. The process of this invention is also applicable to the separation of ruthenium values and zirconium and/or niobium values from aqueous solutions containing them together with actinide metal values.

The method of this invention, for instance, has been found useful in the processing, for the purpose of separation, of the so-called dissolver solutions which are the solutions obtained when neutron-irradiated uranium is dissolved in an excess of nitric acid. Such dissolver solutions contain uranium, plutonium and fission products. The most troublesome fission products are ruthenium, zirconium and niobium because it is rather difficult to separate them from uranium and plutonium; this is especially true for separation by solvent extraction where these three mentioned fission products are frequently, at least partly, coextracted with the uranium.

Solvent extraction processes as applied to dissolver solutions usually broadly comprise contacting them with a water-immiscible organic solvent whereby the uranium and plutonium are extracted into an extract phase while the fission products remain in the aqueous solution; however, as has been mentioned above, a considerable part of the ruthenium, zirconium and niobium values is usually coextracted thereby with the uranium and plutonium. The plutonium is then reduced to the trivalent state and back-extracted with an aqueous medium. The solvent phase thus left contains uranium and still the ruthenium, zirconium and niobium values originally coextracted.

The process of this invention is well suitable for separating the ruthenium, zirconium and niobium values from the uranium in solutions just described. Of course, these values can also be removed by the process of this invention from the original dissolver solutions, prior to solvent extraction.

Ruthenium compounds have many uses. For instance, they are useful as catalysts in chemical processes; ruthenium chloride is employed for medicinal purposes. Furthermore, ruthenium-containing alloys have been widely used. The latter is also true in regard to zirconium and niobium, the zirconium playing an important part in alloys for corrosion-resistant construction materials as they are employed, for instance, in the chemical industry, and niobium being a valuable component of special steels.

A method has been devised for the removal of ruthenium according to which the ruthenium is complexed with organic sulfo compounds such as mercaptans, thioethers, and alkyl disulfides whereby an insoluble ruthenium complex is formed and the precipitate is separated from the solutions by filtration or the like. If the ruthenium is present in such solutions to be treated in microamounts, a carrier compound has to be added in order to obtain complete precipitation. This method is disclosed in detail and claimed in the copending application, Serial No. 414,235, filed by one of the inventors as coinventor on March 4, 1954. The process of the instant invention is an improvement of the method of that copending application and accomplishes simultaneous removal of the zirconium and/or niobium values and the ruthenium values without the necessity of any additional step.

It is thus an object of this invention to provide a process for the removal of ruthenium values and also of niobium and/or zirconium values from aqueous solutions in the same steps.

It is another object of this invention to provide a process for the removal of ruthenium values and niobium and/or zirconium values which is simple, economical and for which no elaborate equipment is necessary.

It is also an object of this invention to provide a process for the removal of ruthenium values and niobium and/or zirconium values from aqueous solutions which does not require a filtration step prior to the separation of the zirconium and niobium values.

It is finally also an object of this invention to provide a process for the removal of micro-amounts of ruthenium values and niobium and/or zirconium values from aqueous solutions which does not require the addition of a carrier compound.

These and other objects are accomplished by adding to an aqueous solution containing mineral acid salts of ruthenium and also of zirconium and/or niobium an organic compound selected from the group consisting of mercaptans, thioethers and alkyl disulfides whereby said ruthenium salt is complexed, and thereafter passing the solution over silica gel whereby the ruthenium complex, the niobium and zirconium salts are adsorbed on said silica gel.

The process can be carried out with an acidic or an acid-deficient solution; however, acid-deficient solutions have given better results. While the process can be carried out with solutions containing the values to be removed in the form of chlorides as well as nitrates, the latter has been preferred.

The organic sulfo compounds best suitable as precipitants are 2-mercaptoethanol, $\beta$-mercaptopropionic acid and 2,3-dimercaptopropanol-1. Upon addition of the sulfo compound to the aqueous solution, an odor of hydrogen sulfide could never be detected which indicates that there is no hydrolysis taking place of the organic sulfo compounds and that the ruthenium nitrate is not converted to the sulfide, but rather forms a true compound or complex with the organic sulfo compound.

The concentration of the organic sulfo compound, of course, is dependent on the ruthenium content. A concentration as low as 0.025 N, however, has been found suitable for dissolver solutions of the usual concentrations.

The sulfo compound is preferably added to the solution at room temperature and the mixture is then allowed to digest at about 50° C. for from two to three hours.

After digestion the solution is ready for contact with the silica gel. Any commercially available silica gel has been found suitable for the process of this invention. It was found that the flow rate of the solution through the silica gel bed or column should not exceed 0.2 cc./min./cc. bed, or else the degree of decontamination is impaired.

Some dissolver solutions, it was found, contain nitrite which decomposes, and thus makes ineffective, part of the mercaptan. In order to overcome this disadvantage, so-called nitrite suppressors were added to nitrite-containing solutions. Urea, sulfamic acid, and a mixture of ferrous ammonium sulfate and sulfamic acid were found completely to eliminate the draw-back encountered in the presence of nitrite. A concentration of about 0.1 M was sufficient for urea as well as for sulfamic acid, while a concentration of 0.1 M each was satisfactory in the case of the sulfamic acid-ferrous ammonium sulfate mixture in dissolver solutions of the usual concentrations.

In the following, a number of examples are given to illustrate the efficiency of the process of this invention. In all instances the silica gel used had a grain size between 40 and 50 mesh.

EXAMPLE I

A dissolver solution was extracted by means of hexone (methyl isobutyl ketone) and the uranium was back-extracted into an aqueous solution. This aqueous solution was treated by the process of this invention.

The aqueous solution contained uranyl nitrate hexahydrate in a concentration of 2.12 M, $1.0 \times 10^6$ gross beta counts/min./ml. (25 mg./cm.$^2$ Au Abs.), $8.8 \times 10^5$ gross gamma counts/min./ml. (8.9 g./cm.$^2$ Pb Abs.) and $1.32 \times 10^5$ ruthenium beta counts/min./ml. (25 mg./cm.$^2$ Au Abs.). 2,3-dimercaptopropanol-1 was added to the solution in a quantity to obtain a concentration of 0.05 M. A total volume of silica gel of 1 cc. was arranged in a column of 19 cm. length. The solution was passed through the silica gel at a flow rate between 0.2 and 0.3 cc./min./cc. bed. At various stages the decontamination factors (content in feed divided by content in effluent) were determined from the activities then found in the effluents.

Two batches of solutions were treated in two parallel runs, runs A and B, one employing an acid-deficient solution, while the solution for the other run had been acidified with nitric acid after the addition of the sulfo compound. The results of these two runs are compiled in Table I.

Table I

| Total Feed, cc. | Feed Acidity, M | Decontamination Factors | | | | |
|---|---|---|---|---|---|---|
| | | gross β | gross γ | Ru β | Zr γ | Nb γ |
| Run A: | | | | | | |
| 17 | −0.19 | 2.1 | 5.7 | 5 | 1.3 | 1.2 |
| 118 | −0.19 | 3.9 | 7.2 | 19 | 7.1 | 4.6 |
| 235 | −0.19 | 4.7 | 10 | 15 | 7.3 | 4.7 |
| 462 | −0.19 | 26 | 65 | 18 | 6.8 | 5.1 |
| Run B: | | | | | | |
| 60 | 0.10 | 11 | 14 | 6.1 | 5.2 | 2.5 |
| 256 | 0.10 | 6.8 | 6.2 | 8.4 | 2.5 | 1.5 |
| 490 | 0.10 | 52 | 57 | 17 | 4.1 | 1.7 |

It will be seen from the above results that good decontamination was obtained in both instances. The wide variations in decontamination factors are probably due to fluctuations in the flow rate and due to the fact that, in particular for the beta decontamination, flow rates above 0.2 cc./min./cc. bed are less effective, as has been set forth above.

EXAMPLE II

To a feed solution containing uranyl nitrate hexahydrate in a concentration of 2.01 M fission products in concentrations of $1.0 \times 10^6$ gross beta counts/min./ml. (25 mg./cm.$^2$ Au Abs.), $6.1 \times 10^5$ gross gamma counts/min./ml. (8.9 g./cm.$^2$ Pb Abs.) and $9.4 \times 10^5$ ruthenium beta counts/min./ml. (25 mg./cm.$^2$ Au Abs.) 2,3-dimercaptopropanol-1 was added to yield a concentration of 0.025 M. A silica gel bed was used in this instance which was 8 cm. high and had a total volume of 2 cc. A total of 566 cc. of feed solution was passed through the silica gel. This was done in two installments whereby in effect two runs were carried out, the first run using an acid-deficient and the second run a nitric acid-containing feed. The decontamination factors were determined at various stages of the runs. They are listed in Table II.

Table II

| Total Feed, cc. | Flow Rate, cc./min./cc. bed | Feed Acidity, M | Decontamination Factors | | | | |
|---|---|---|---|---|---|---|---|
| | | | gross β | gross γ | Ru β | Zr γ | Nb γ |
| 52 | 0.04 | −0.27 | 21 | 44 | 216 | 12 | 1.0 |
| 94 | 0.05 | −0.27 | 25 | 18 | 233 | 10 | 1.3 |
| 170 | 0.16 | −0.27 | 33 | 21 | 411 | 4.1 | 1.1 |
| 346 | 0.25 | 0.30 | 10 | 10 | 665 | 3.2 | 1.8 |
| 500 | 0.21 | 0.30 | 21 | 19 | 583 | 4.1 | 2.0 |
| 566 | 0.19 | 0.30 | 33 | 28 | 647 | 4.0 | 2.0 |

These experiments prove that a concentration of the sulfo compound of 0.025 M is sufficient for satisfactory decontamination and that zirconium and ruthenium decontaminations are better from acid-deficient solutions than from acidic ones.

EXAMPLE III

In this experiment a feed solution was used which contained uranyl nitrate and fission products, including ruthenium, in approximately the same concentrations as the solution used for Example I; the nitric acid concentration was 0.30 M. The sulfo compound used in this case was β-mercaptopropionic acid; it was added in a quantity so as to yield a concentration of 0.05 M. The silica gel bed, too, had the same dimensions as that of Example I. The flow rate was 0.3 cc./min./cc. bed. The results are summarized below in Table III.

Table III

| Total Feed, cc. | Decontamination Factors | | | | |
|---|---|---|---|---|---|
| | gross β | gross γ | Ru β | Zr γ | Nb γ |
| 83 | 1.6 | 1.9 | 2.3 | 5.5 | 2.2 |
| 298 | 1.5 | 1.7 | 2.2 | 3.2 | 1.6 |
| 468 | 1.6 | 1.9 | 2.7 | 3.1 | 1.6 |

The decontamination factors obtained in this instance are comparatively low, which is most likely due to the excessively high flow rate. Also the higher acidity might have had some bearing on the decreased efficiency in this experiment.

It will be understood that this invention is not to be limited to the details given herein but that it may be modified within the scope of the appended claims.

What is claimed is:
1. A method of simultaneously separating ruthenium values and at least one of the values selected from the group consisting of zirconium values and niobium values from uranium values contained in an aqueous solution comprising adding an organic compound selected from the group consisting of 2,3 - dimercaptopropanol - 1,2-mercaptoethanol and β-mercaptopropionic acid to said solution, contacting the mixture thus obtained with silica gel whereby the ruthenium values and zirconium and niobium values are adsorbed on said silica gel while said uranium values remain in solution, and separating the silica gel from the solution.

2. The process of claim 1 wherein the organic compound is added in such a quantity that a concentration of about 0.025–0.05 M is obtained in the solution.

3. The process of claim 2 wherein the organic compound is 2,3-dimercaptopropanol-1.

4. The process of claim 2 wherein the organic compound is β-mercaptopropionic acid.

5. The process of claim 1 wherein the organic compound is added to the solution at room temperature and the mixture is then allowed to digest at about 50° C. for two to three hours prior to contact with silica gel.

6. A method of simultaneously separating ruthenium values and at least one of the values selected from the group consisting of zirconium values and niobium values from an aqueous solution comprising adding an organic compound selected from the group consisting of 2,3-dimercaptopropanol - 1,2 - mercaptoethanol and β-mercaptopropionic acid to said solution, contacting the mixture thus obtained with silica gel whereby the ruthenium values and zirconium and niobium values are adsorbed on said silica gel, and separating the silica gel from the solution.

References Cited in the file of this patent

Claesson: Journal für praktische Chemi, vol. 123 (N. F. 15), pages 193–218, particularly 206–7) (1877).